(12) United States Patent
Babin

(10) Patent No.: US 6,688,875 B2
(45) Date of Patent: Feb. 10, 2004

(54) NOZZLE END FOR MULTIPLE TIPPED INJECTION MOLDING NOZZLE

(75) Inventor: Denis Babin, Georgetown (CA)

(73) Assignee: Mold-Masters Limited, Georgetown (CA)

(*) Notice: Subject to any disclaimer, the term of this patent is extended or adjusted under 35 U.S.C. 154(b) by 22 days.

(21) Appl. No.: 10/052,571

(22) Filed: Jan. 23, 2002

(65) Prior Publication Data

US 2002/0098262 A1 Jul. 25, 2002

(30) Foreign Application Priority Data

Jan. 23, 2001 (CA) .............................................. 2332061

(51) Int. Cl.⁷ ............................................. B29C 45/22
(52) U.S. Cl. .................. 425/549; 264/328.15; 425/568; 425/572
(58) Field of Search ................................. 425/549, 568, 425/572; 264/328.15, 328.8

(56) References Cited

U.S. PATENT DOCUMENTS 5,820,899 A    10/1998  Gellert et al.
6,009,616 A  *  1/2000  Gellert ........................ 425/549

* cited by examiner

Primary Examiner—Tim Heitbrink
(74) Attorney, Agent, or Firm—Foley & Lardner

(57) ABSTRACT

A nozzle end is provided for removable mounting to a nozzle body for use in multiple-tipped molding applications such as edge-gated systems. The nozzle end is made of a highly thermally conductive material and is preferably inserted at least partially inside the forward end of the heated nozzle body. Removable nozzle tips are insertable in the front end of the nozzle end.

15 Claims, 16 Drawing Sheets

US 6,688,875 B2

NOZZLE END FOR MULTIPLE TIPPED INJECTION MOLDING NOZZLE

FIELD OF THE INVENTION

This invention relates generally to injection molding and more particularly to an extension member for mounting to a heated multiple-tipped nozzle in a well in a mold.

BACKGROUND OF THE INVENTION

A key concern in injection molding is temperature of the pressurized melt as it passes through the runner system to the mold cavity. Thus, among other steps taken, the nozzle is usually heated, typically by an electrical element wrapped therearound. A difficulty arises, however, in the case of multiple-tipped nozzles, and particularly in the case of edge-gated nozzles, in that it is often difficult to extend the heating element all the way to the forward or mold end of the nozzle because it would interfere with the nozzle gating. Accordingly there is a need for a multiple-tipped injection molding nozzle offering improved temperature control adjacent the forward end of the nozzle.

SUMMARY OF THE INVENTION

In one aspect the present invention provides an injection molding apparatus comprising a plurality of mold cavities formed between at least one pair of mold plates, each cavity having a gate for communicating with an interior of the cavity, at least one injection molding nozzle body having a back end, a front end, at least one melt channel through the body and a heating member for heating the body, the at least one body capable of receiving heated pressurized melt from a source and capable of feeding the heated pressurized melt from the back end through the at least one melt channel to the front end, and a nozzle end mounted to the front end of the at least one body, the nozzle end having a bore therethrough extending from the melt channel at the body front end and communicating with at least two of the plurality of mold cavities, the nozzle end being made substantially of a material having a higher thermal conductivity than the at least one body.

In a second aspect, the present invention provides an improvement in an injection molding apparatus having at least one heated nozzle extending forwardly into a well in a mold, the well having a wall with a plurality of gates spaced therein, each gate extending to a cavity in the mold, the at least one nozzle having a rear end, a front end and a melt channel, the melt channel extending from an inlet at the rear end of the nozzle to an outlet at the front end of the nozzle, the improvement comprising a nozzle end mounted to the front end of the at least one nozzle, the nozzle end having a bore therethrough adapted to extend from the melt channel outlet at the front end of the nozzle and to communicate with the plurality of gates, the nozzle end being made substantially of a material having a higher thermal conductivity than the nozzle.

In a third aspect, the present invention provides an injection molding apparatus comprising at least one mold cavity formed between at least one pair of mold plates, the at least one cavity having a gate for communicating with an interior of the cavity, at least one injection molding nozzle body having a back end, a front end, at least one melt channel through the body and a heating member for heating the body, the at least one body capable of receiving heated pressurized melt from a source and capable of feeding the heated pressurized melt from the back end through the at least one melt channel to the front end, and a nozzle end mounted to the front end of the at least one body, the nozzle end having a bore therethrough extending from the melt channel at the body front end and communicating with the at least one mold cavity, the bore having a portion extending substantially perpendicularly to the melt channel, the nozzle end being made substantially of a material having a higher thermal conductivity than the at least one body.

BRIEF DESCRIPTION OF THE DRAWINGS

For a better understanding of the present invention, and to show more clearly how it may be carried into effect, reference will now be made by way of example to the accompanying drawings.

FIG. 7b is a much enlarged view of the sealing means of the nozzle end of FIG. 7a.

DETAILED DESCRIPTION OF THE PREFERRED EMBODIMENTS

Figure 1:
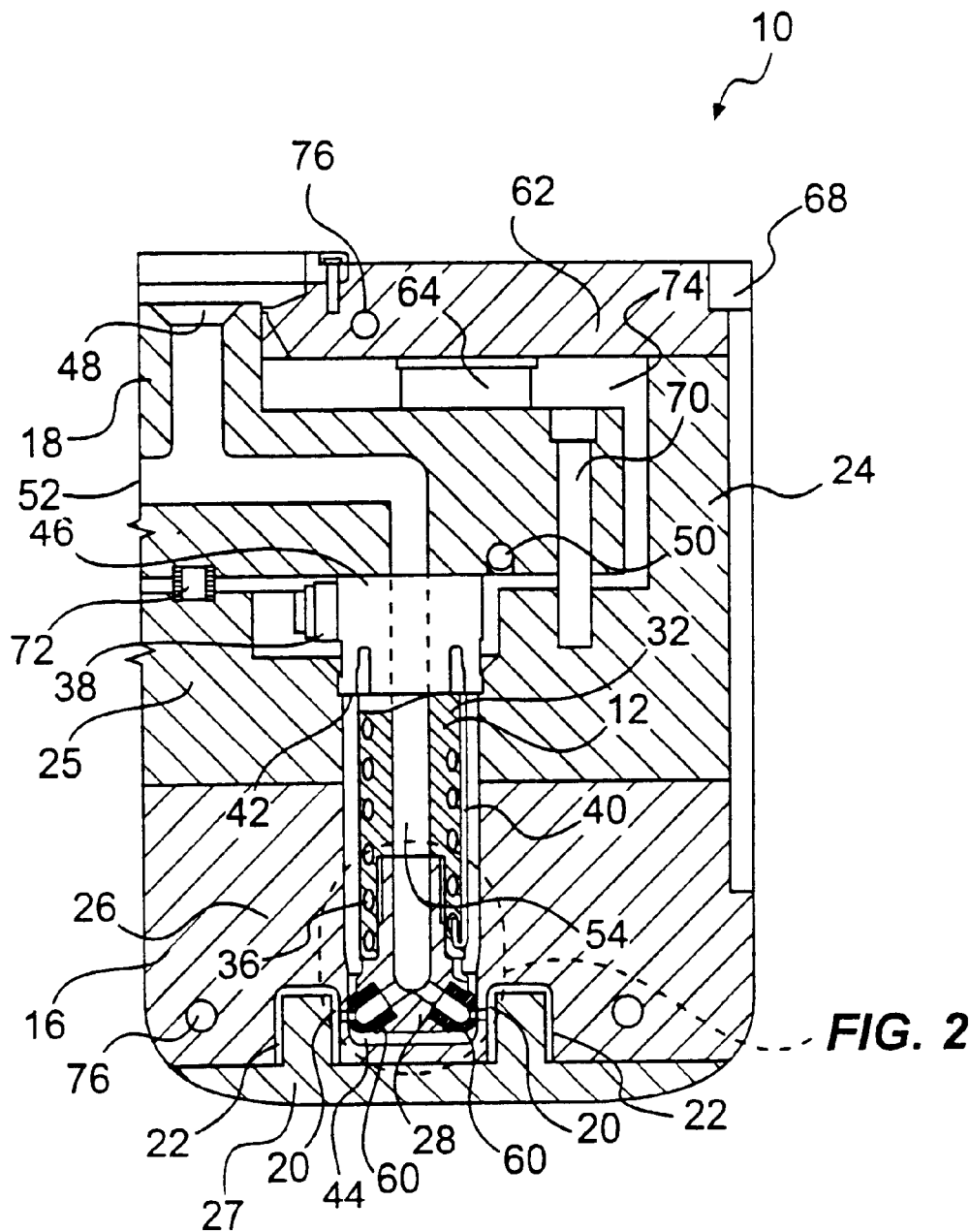
FIG. 1 is a sectional view of a portion of an injection molding system incorporating a nozzle end according to an edge-gated embodiment of the present invention.
Figure 2:
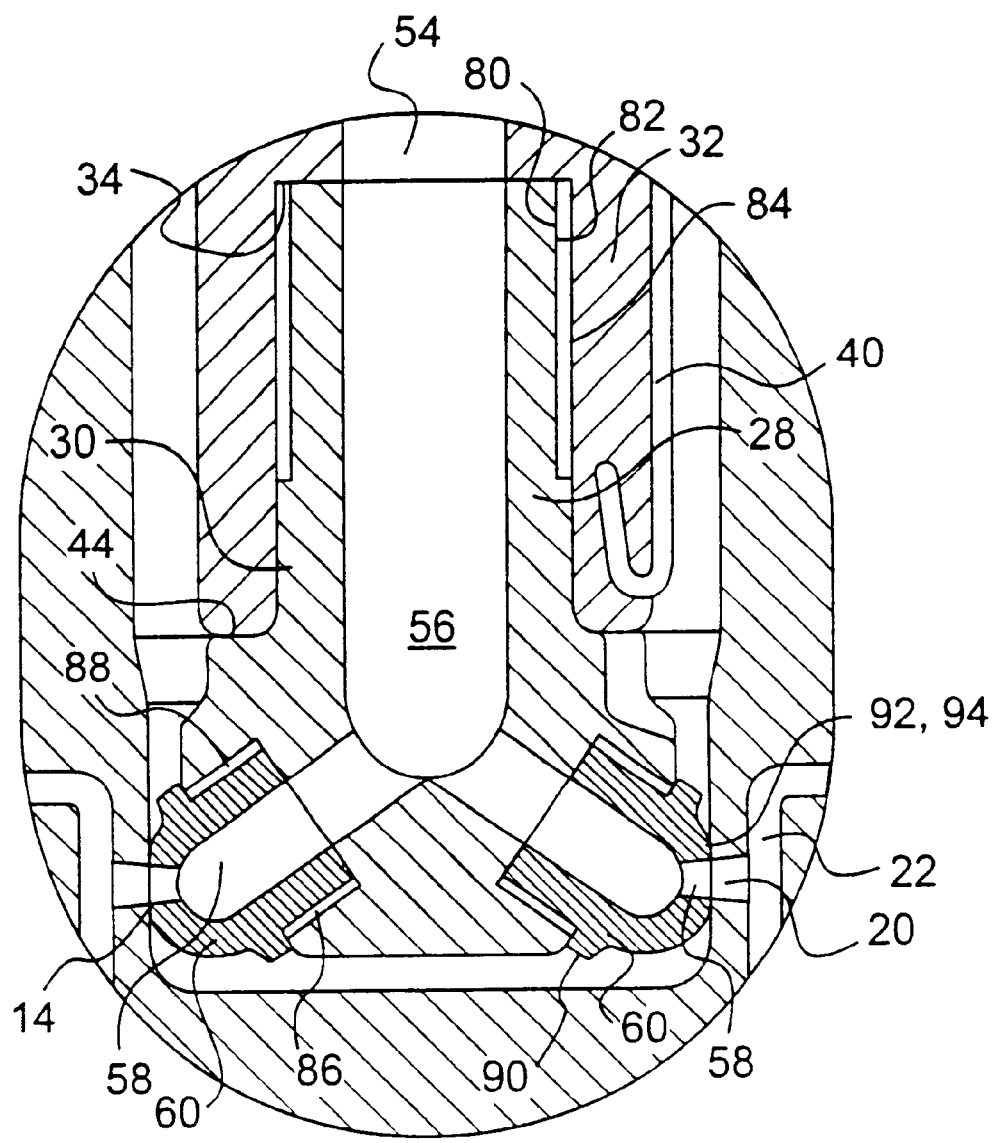
FIG. 2 is an enlarged sectional view of the nozzle end of FIG. 1.

Referring to FIGS. 1 and 2, a portion of an edge gated injection molding system 10 having a nozzle end according to the present invention is shown. System 10 has a heated nozzle 12 in a well 14 in a mold 16. System 10 also has a heated steel manifold 18 to distribute melt to several spaced nozzles 12 (only one of which is shown in FIG. 1), and each nozzle 12 distributes the melt to a plurality of spaced edge gates 20 leading to cavities 22. While, in this example, each well 14 is defined in a support plate 24, a nozzle mold plate 25, a cavity plate 26 and an under cavity plate 27, other arrangements of mold plates can be used if desired.

In this embodiment, each nozzle 12 has a nozzle extension member or nozzle end 28 with a rear portion 30 which extends a distance inside a nozzle body portion 32 of nozzle 12. The distance by which rear portion 30 extends inside body 32 may be varied, as will be discussed further below. Nozzle end 28 is removably mounted to a seat 34 in nozzle body 32, as will also be discussed further below. Nozzle 12 is heated by a electrical heating element 36 extending around nozzle body 32 and to an external terminal 38. Nozzle body 32 has a thermocouple 40, a support flange 42, a forward end 44, and a rear end 46.

Melt distribution manifold 18 has an inlet 48, adapted to communicate with an injection molding machine, and an electrical heating element 50. A melt passage 52 extends from inlet 48 to each nozzle 12, where it communicates with a nozzle melt channel 54 in nozzle body 32. Melt channel 54 communicates with a bore 56 in nozzle end 28 which, in turn, communicates with tip channels 58 in a plurality of nozzle tips 60. In this embodiment, tips 60 are tip edge gates adapted to deliver pressurized melt through mold gates 20 to cavities 22. Manifold 18 is mounted between support plate 24 and a back plate 62. Insulative and resilient spacer members 64 are located between manifold 18 and back plate 62 by pins (not shown). Bolts 68 which extend through the mold plates to hold them together apply a force through spacer members 64 to hold the manifold 18 and nozzles 12 securely in position. Bolts 70 which extend from manifold 18 into the mold also secure manifold 18 tightly against rear end 46 of the nozzle 12. A central locating ring 72 is seated between manifold 18 and nozzle mold plate 25 to accurately locate the manifold in place. This provides an insulative air space 74 between heated manifold 18 and adjacent support plate 24, nozzle mold plate 25 and back plate 62. Cooling conduits 76 circulate water through cavity plate 26 and back plate 62 for cooling the mold.

Referring specifically to FIG. 2, nozzle end 28 contacts and abuts nozzle body 32 along an interface 80. Nozzle end 28 has mounting means 82 for releasably mounting nozzle end 28 in seat 34 of nozzle body 32. In this case, mounting means 82 comprises a mating thread set 84 in nozzle end 28 and seat 34. Similarly, nozzle tips 60 have mounting means 86, in this case thread sets 88, for releasably mounting tips 60 to nozzle end 28. Each nozzle tip 60 has a collar 90 which is preferably hexagonally-shaped and adapted to permit tip 60 to grasped by an appropriate tool for mounting and demounting tip 60 to nozzle end 28. Tip 60 also has sealing means 92 for sealingly engaging the inner surface of well 14 around gate 20 to minimize leakage of pressurized melt into the space between well 14 and nozzle 12. In this case, sealing means 92 comprises a flat flange or face 94 adapted to seat against the wall of well 14.

Nozzle end 28 is made of a highly thermally conductive material such as beryllium copper alloy or tungsten carbide. The material preferably has a thermal conductivity higher than that of steel. Nozzle body 32 may be of standard steel construction. Tips 60 are preferably made of a wear resistant material, such tungsten carbide, which advantageously also gives tips 60 good thermal conduction characteristics.

In use, injection molding system 10 is assembled as shown in FIG. 1. Electrical power is applied to heating element 50 in manifold 18 and to heating elements 36 in nozzles 12 to heat them to a predetermined operating temperature. Some heat energy transferred from heating element 36 to nozzle body 32 is subsequently transferred by conduction across interface 80 to nozzle end 28, and from nozzle end 28 to tips 60. Thermocouple 40 provides temperature feedback to a controller. Once at operating temperature, pressurized melt from an injection molding machine (not shown) is injected into the melt passage 52 according to a controlled cycle. Pressurized melt passes from inlet 48, through melt passage 52, melt channel 54, bore 56, tip channels 58 and edge gates 20 to fill cavities 22. After cavities 22 are filled, injection pressure is held momentarily to pack the molded products and then the pressure is released. After a short cooling period, the mold is opened to eject the molded products. After ejection, the mold is closed and injection pressure is reapplied to refill cavities 22. This cycle is continuously repeated with a frequency dependent, inter alia, on the size and shape of the cavities and the type of material being molded.

The heat energy transferred to nozzle end 28 is, by nature of the highly conductive nature of the material of which the nozzle end is made, readily available to permit melt in bore 56 and tip channels 58 to be maintained at a desired temperature. Unlike the prior art, heat control is more accurately in the vicinity of the nozzle end, where the placement of external heaters is often not feasible due to gate and tip configuration constraints. The present invention also offers a simpler and more economical manner in which heat control can be achieved in the melt passage near the tips.

By extending inside nozzle body 32, rear portion 30 provides an increased area to interface 80 over which heat energy may be transferred from heated nozzle body 32 to nozzle end 28. Furthermore, as one skilled in the art will appreciate, rear portion 30 provides additional mass to nozzle end 28 thereby increasing the thermal regulating characteristics of the nozzle end. The length of rear portion 30 may be varied to extend or shorten the length of bore 56, as required by the design of the particular system with which it is to be employed.

Figure 3A:
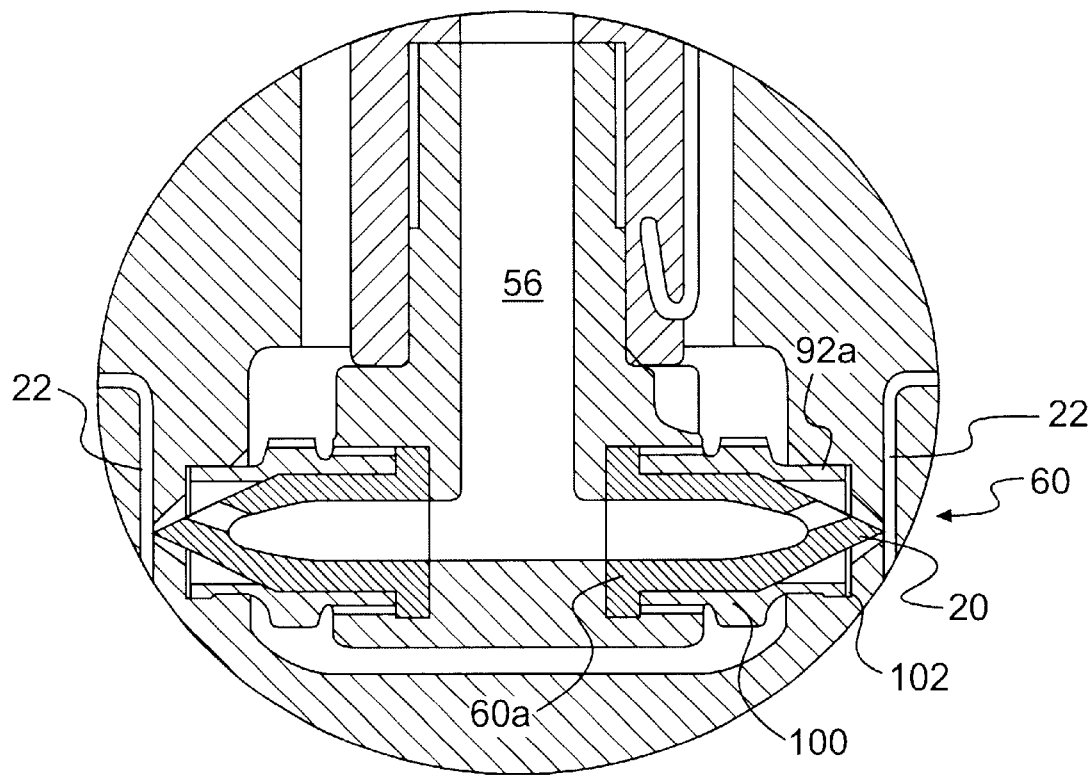
FIGS. 3a–3g are enlarged sectional views of certain modifications available to the nozzle end of FIG. 1.
Figure 3B:
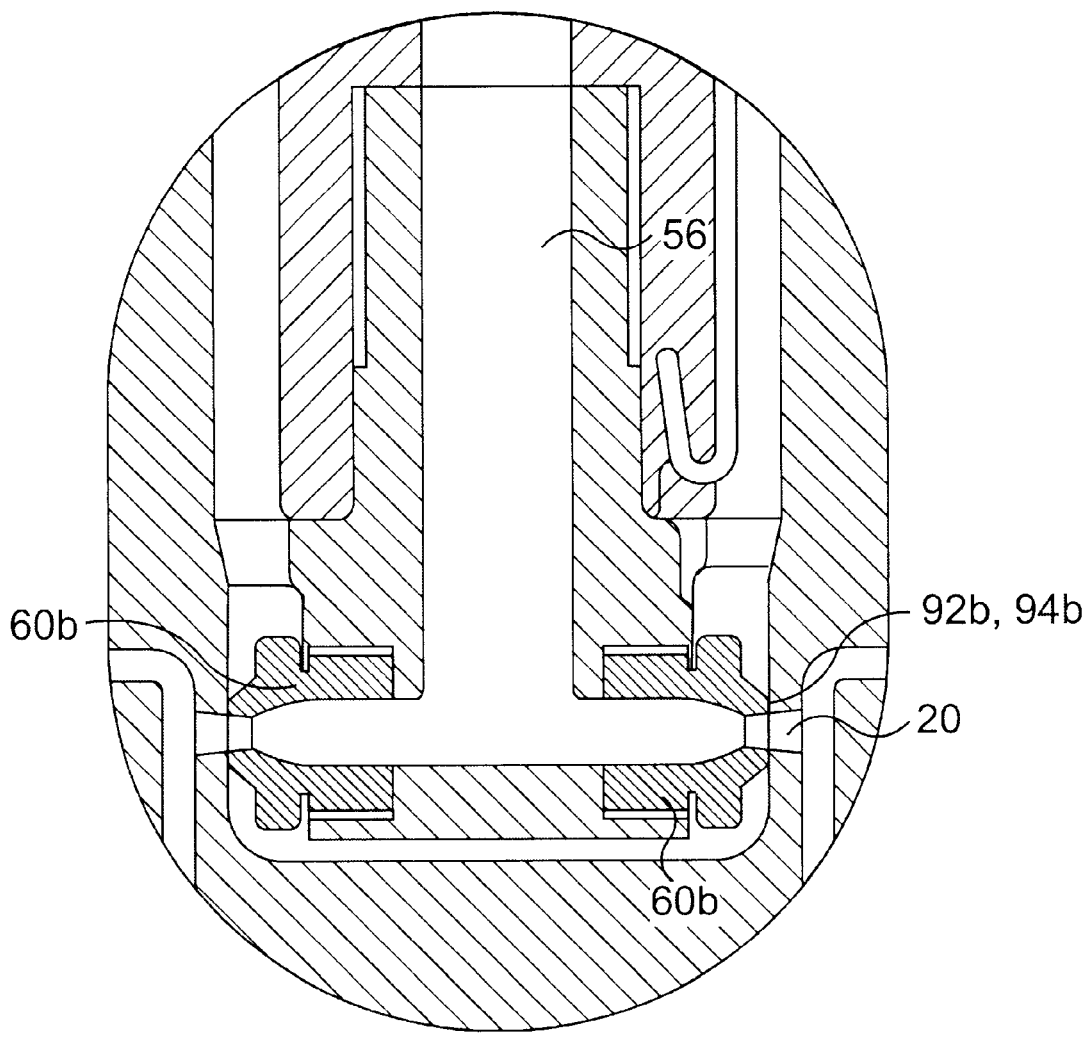
Figure 3C:
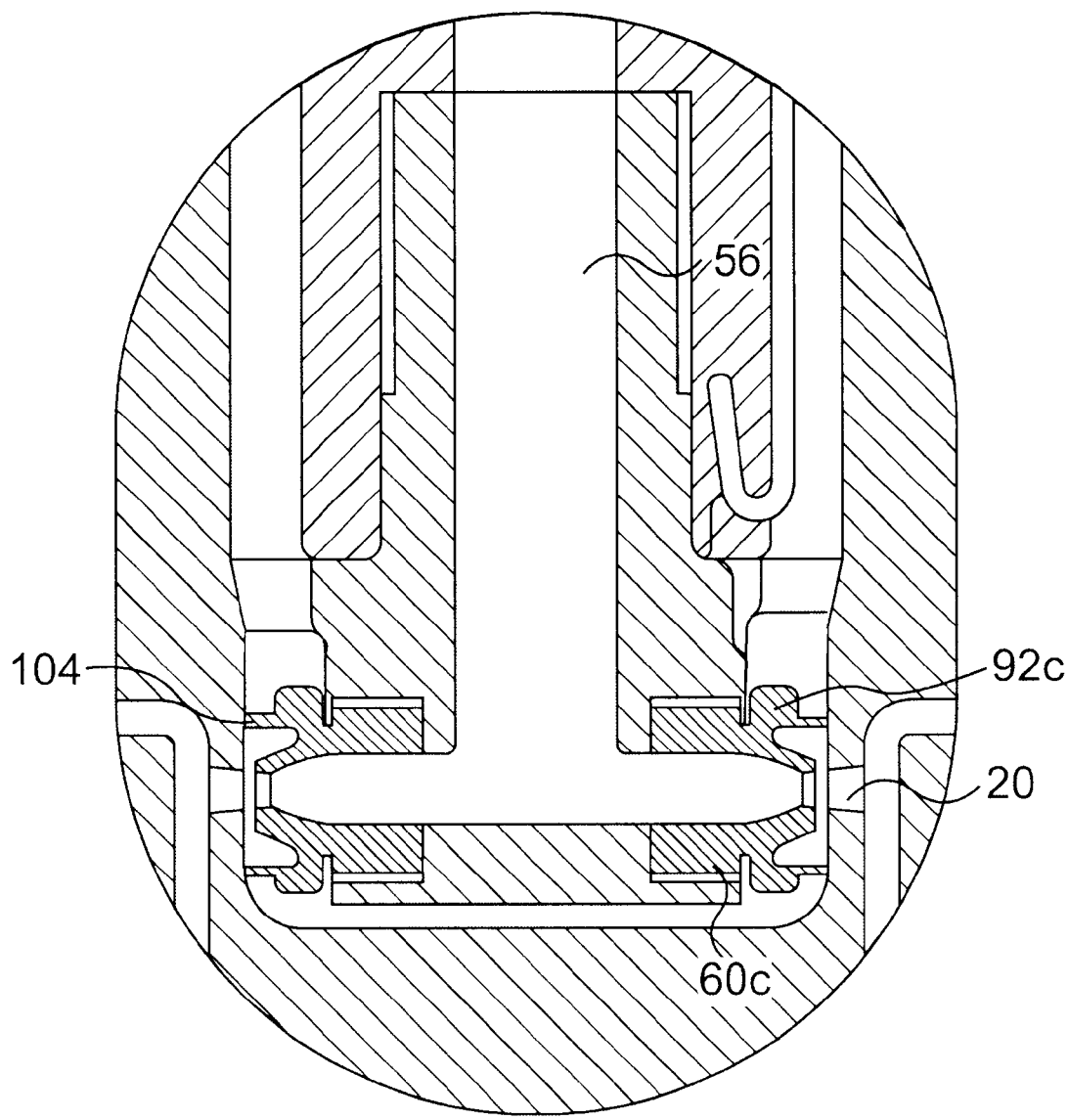

The system of the present invention may be used with any desired tip 60 style. Turning to FIG. 3a, nozzle end 28 may be adapted for use with torpedo style tips 60a, wherein sealing means 92a comprises a nozzle seal sleeve 100 having a forward lip 102 adapted to engage the wall of well 14 to create a seal around gate 20. In this embodiment, tips 60a are arranged perpendicularly to bore 56. Likewise, referring to FIG. 3b, tips 60b have sealing means 92b comprising flat flanges 94b and tips 60b are arranged perpendicularly to bore 56. Referring to FIG. 3c, sealing means 92c of tips 60c comprise an integral circular flange 104 encircling gate 20 and adapted to sealingly engage the wall of well 14.

Figure 3D:
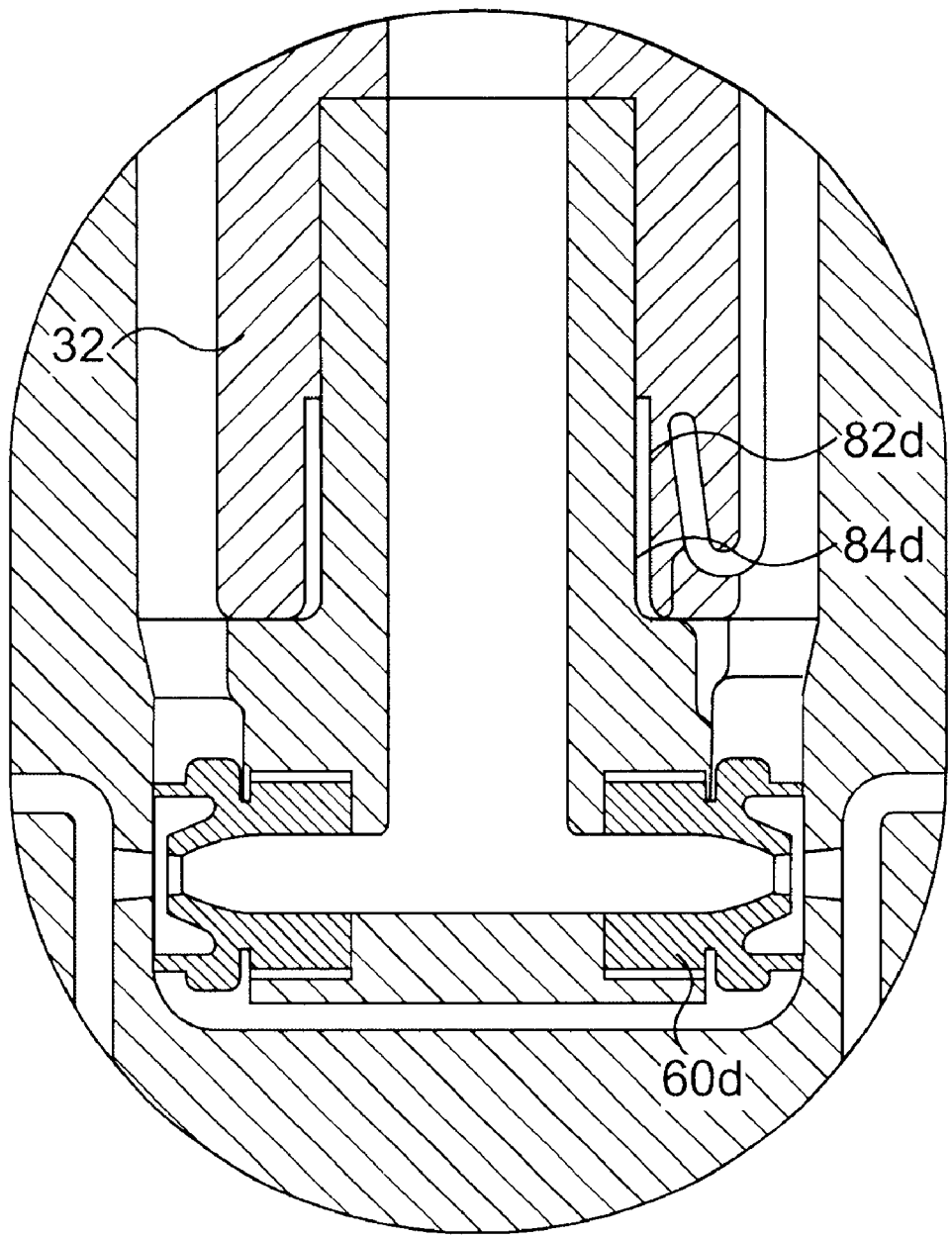
Figure 3E:
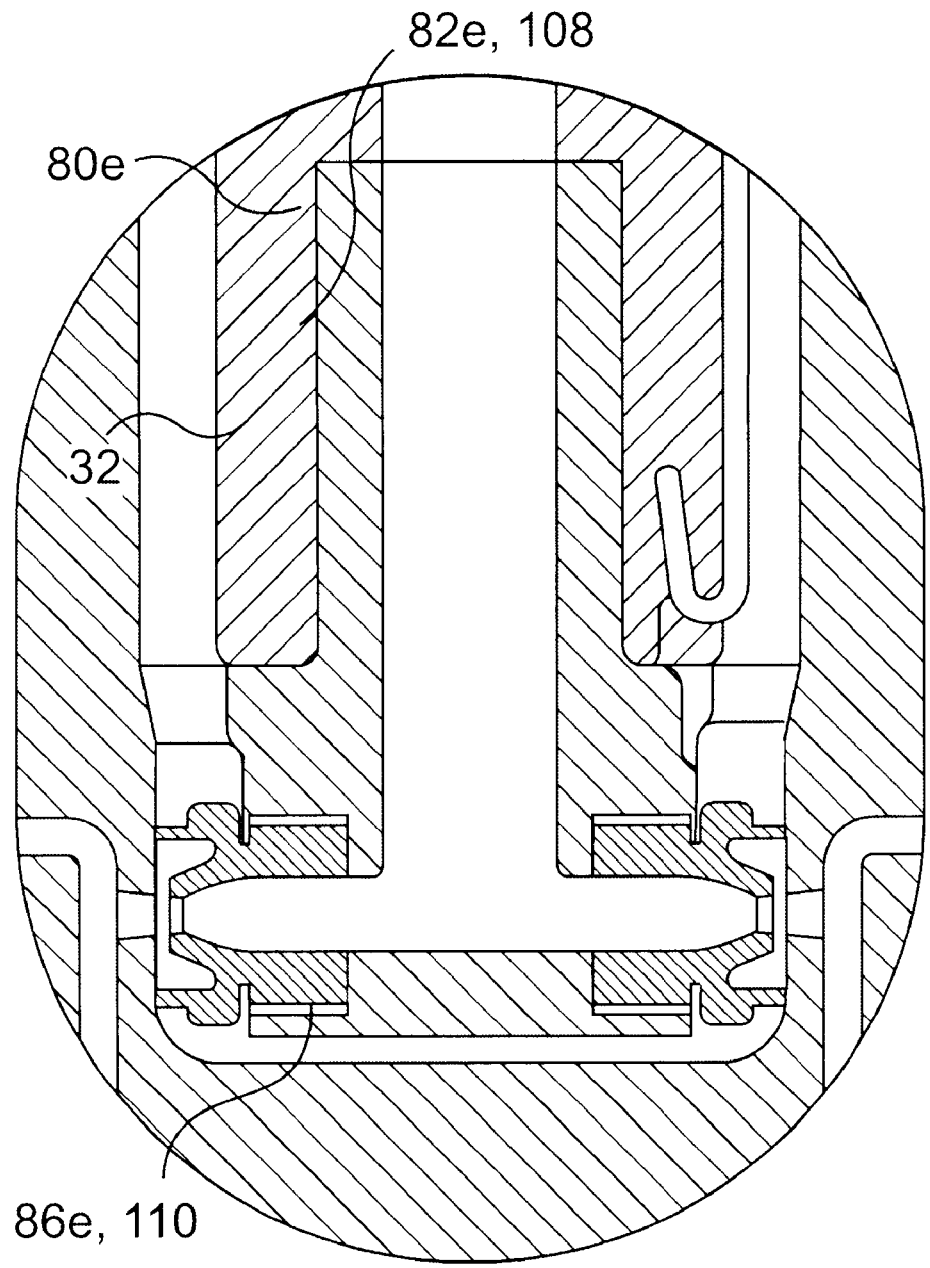
Figure 3F:
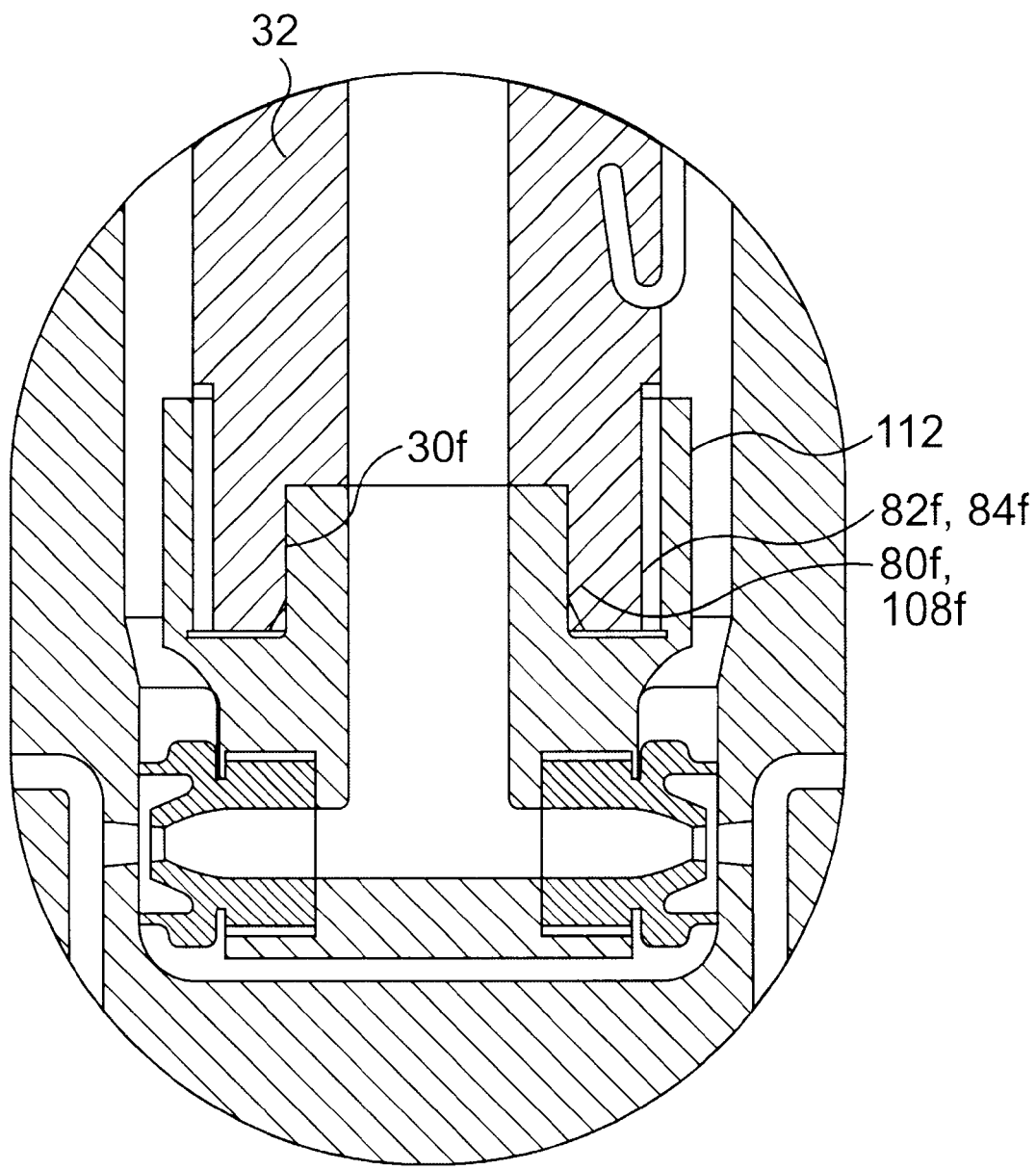
Figure 3G:
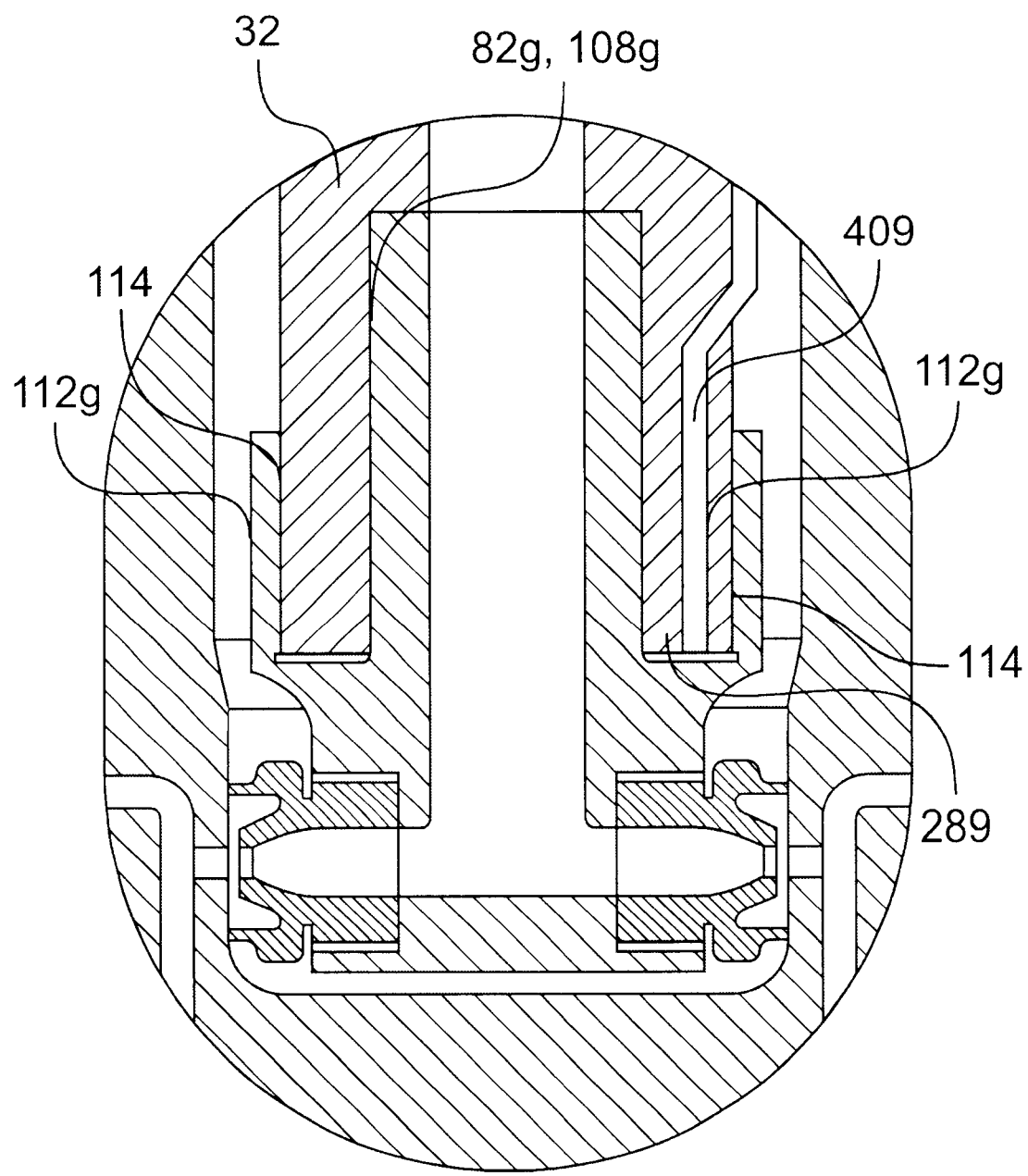

The system of the present invention may employ various means of mounting nozzle end 28 to nozzle body 32. Referring to FIG. 3d, the location of mounting means 82d is variable, and thread set 84d may be moved closer to tips 60d. Referring to FIG. 3e, mounting means 82e comprises brazing 108 along interface 80e. Similarly, mounting means 86e may comprise brazing 110, if desired. Referring to FIG. 3f, mounting means 82f may comprise a thread set 84f extending around the outside of nozzle body 32 between a flange 112 and nozzle body 32. Interface 80f may also be optionally brazed by brazing 108f. FIG. 3f also demonstrates a nozzle 28 having a modified rear portion 30f of decreased length, as previously discussed. Referring to FIG. 3g, mounting means 82g may comprise brazing 108g and may also optionally comprise brazing 114 between flange 112g and body 32. In this embodiment, it is demonstrated that nozzle end 28g may be adapted to permit thermocouple 40g to extend at least partially therein to more accurately monitor the temperature of nozzle end 28g. Thermocouple 40g may be secured therein by copper alloy brazing 116.

Figure 4:
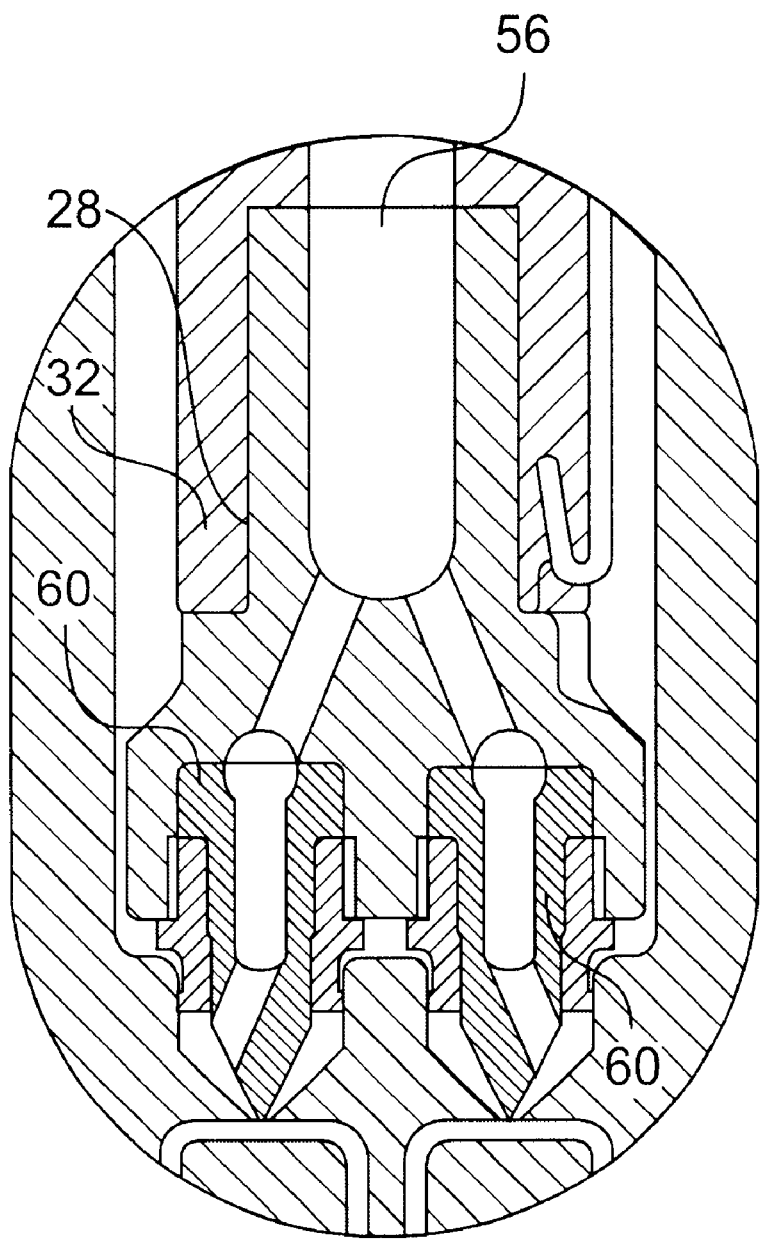
FIG. 4 is an enlarged sectional view of a straight-gated embodiment of the nozzle end of the present invention.
Figure 5A:
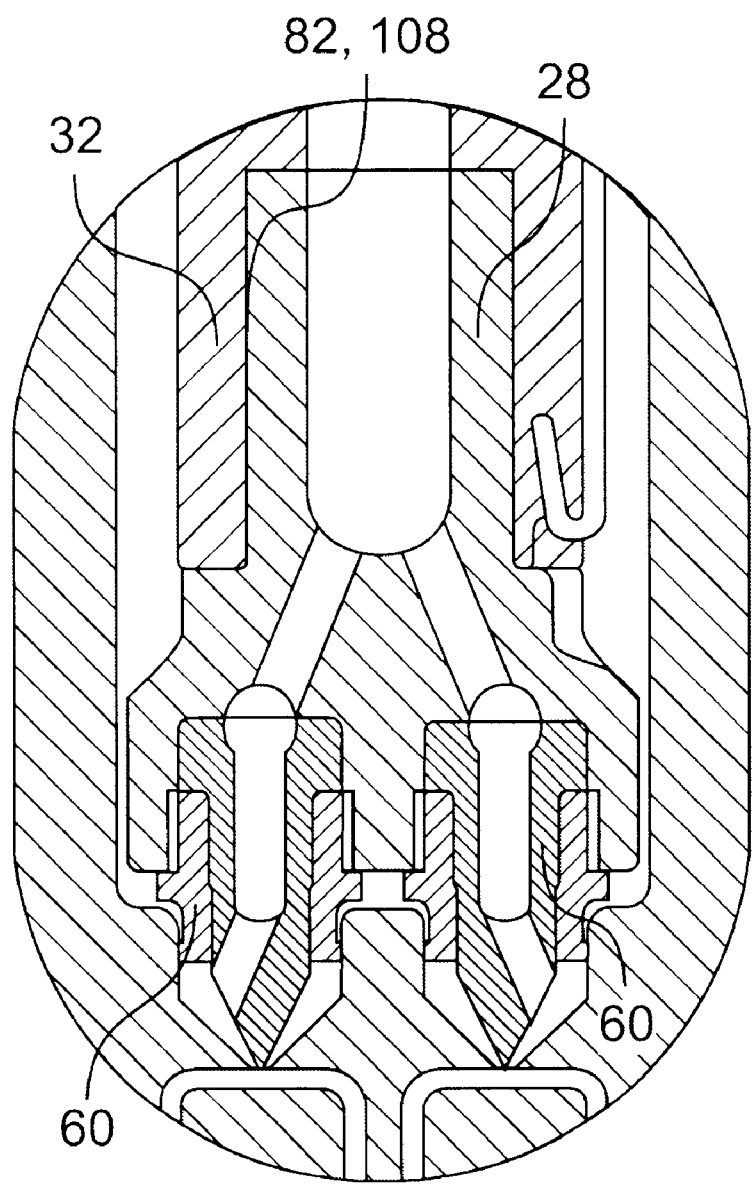
FIGS. 5a–5c are enlarged sectional views of certain modifications available to the nozzle end of FIG. 4.
Figure 5B:
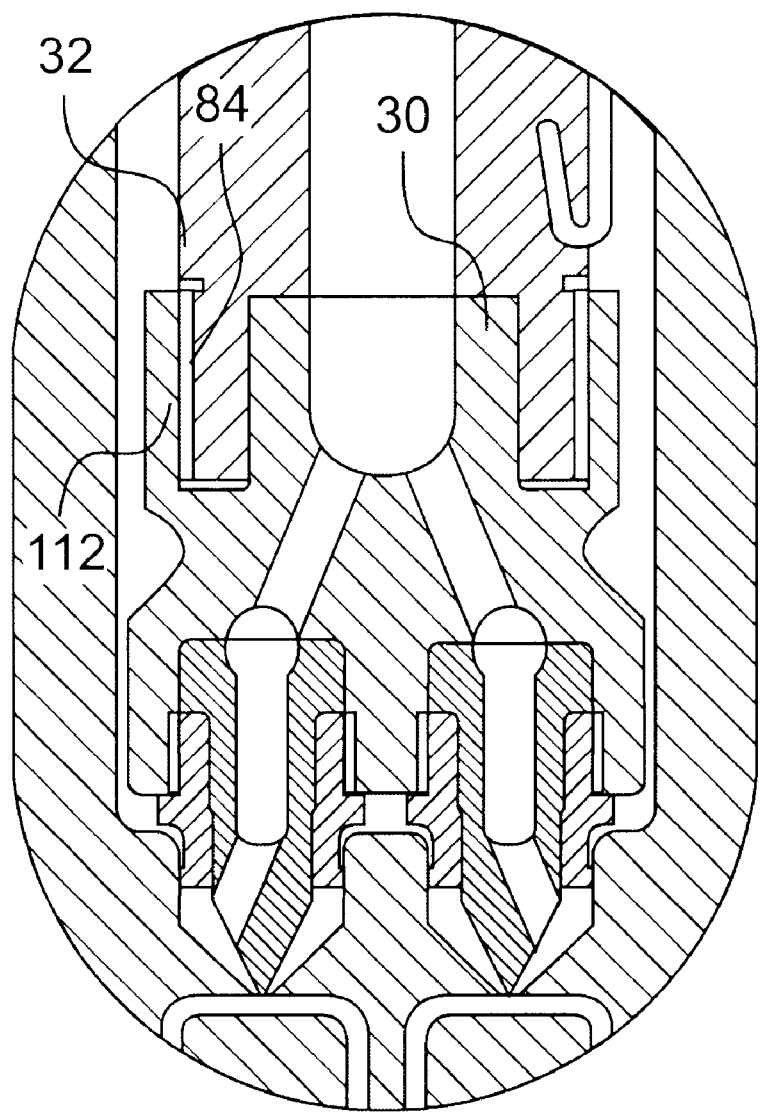
Figure 5C:
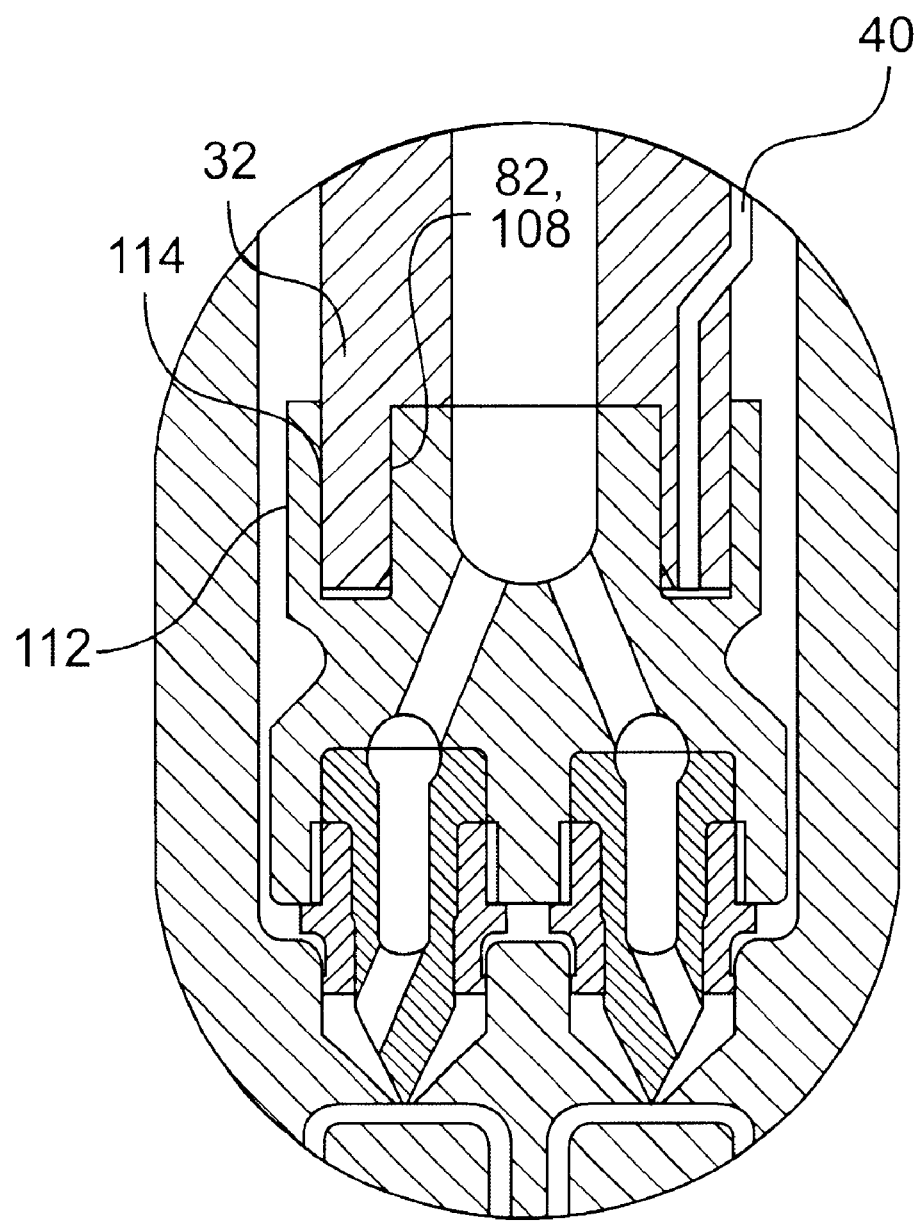

The nozzle end of the present invention may also be employed with other multiple nozzle tip configurations. It will be understood that in the following figures, reference numerals indicating elements similar to the system of FIG. 1 are denoted by the same reference numerals. Referring to FIG. 4, a nozzle end 28 having a multi-tip straight gating configuration is shown. Here, tips 60 are aligned substantially parallel to bore 56 and substantially adjacent to one another. One skilled in the art will appreciate that the modifications of FIGS. 3a–3g are similarly available with this embodiment. Specifically, FIG. 5a shows mounting means 82 as brazing 108, FIG. 5b shows a flange 112 surrounding body 32 and having a thread set 84, and FIG. 5c shows a flange 112 and wherein mounting means 82 comprises a braze 108 and a braze 114. In this embodiment, it is also demonstrated that nozzle end 28 may be adapted to permit thermocouple 40 to extend at least partially therein to more accurately monitor the temperature of nozzle end 28.

Thermocouple 40 may be secured therein by copper alloy brazing. Referring again to FIG. 5b, nozzle end 28 also incorporates a modified rear portion 30 of decreased length.

Figure 6:
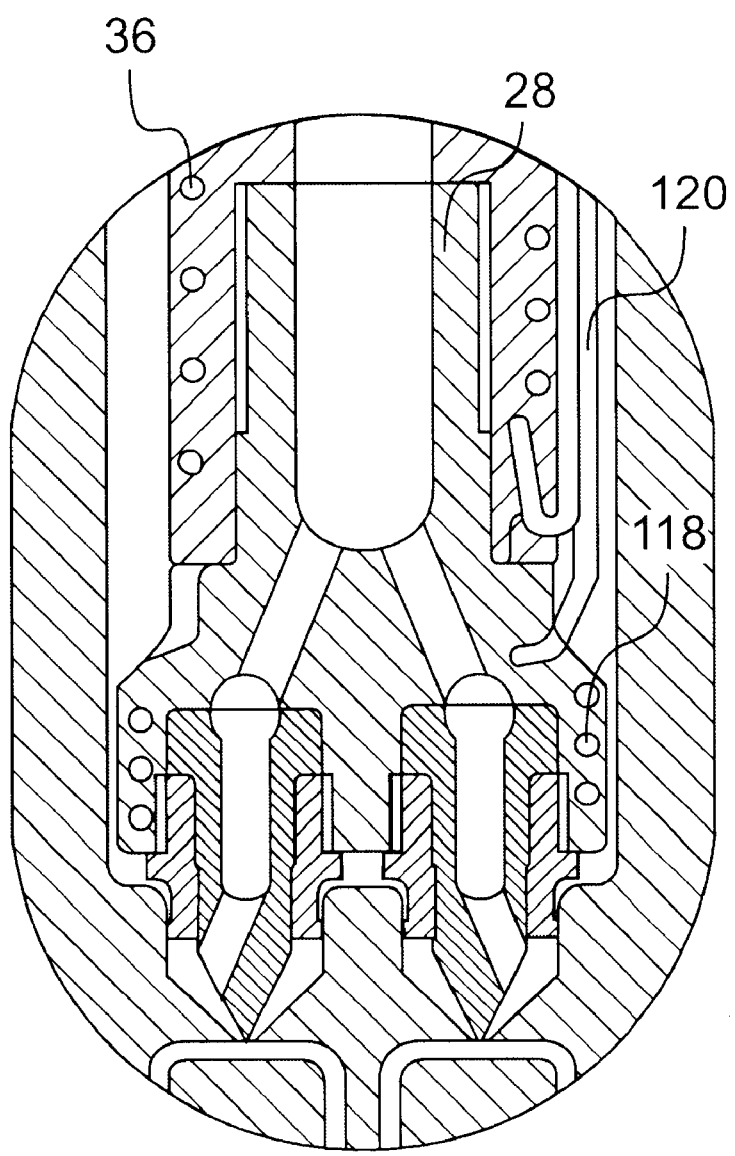
FIG. 6 is an enlarged sectional view of the nozzle end of FIG. 4 according to a further alternate embodiment thereof.

Although the present invention permits better heat control adjacent the nozzle tips without additional heaters, as shown in FIG. 6 it may be desirable in certain instances to include an electrical heating element 118 around nozzle end 28 or, as shown in FIG. 6, integrally incorporated into nozzle end 28. Element 118 may be separately controllable from element 36 and may be monitored independently by a second thermocouple 120. The placement and configuration of heating element 118 is flexible depending on the requirements of the molding system.

Figure 7A:
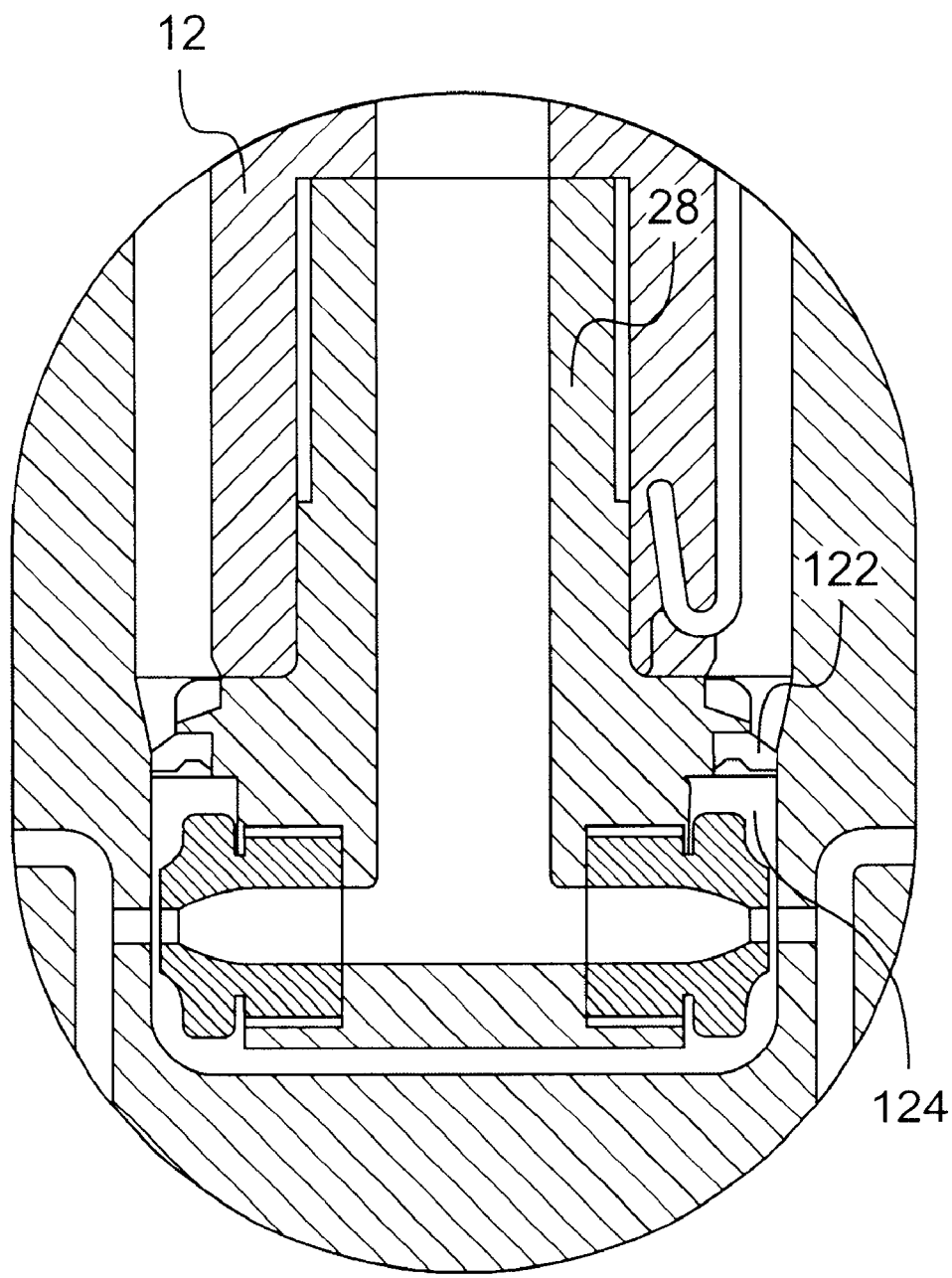
FIG. 7a is an enlarged sectional view of the nozzle end of FIG. 1 according to a yet further alternate embodiment thereof.
Figure 7B:
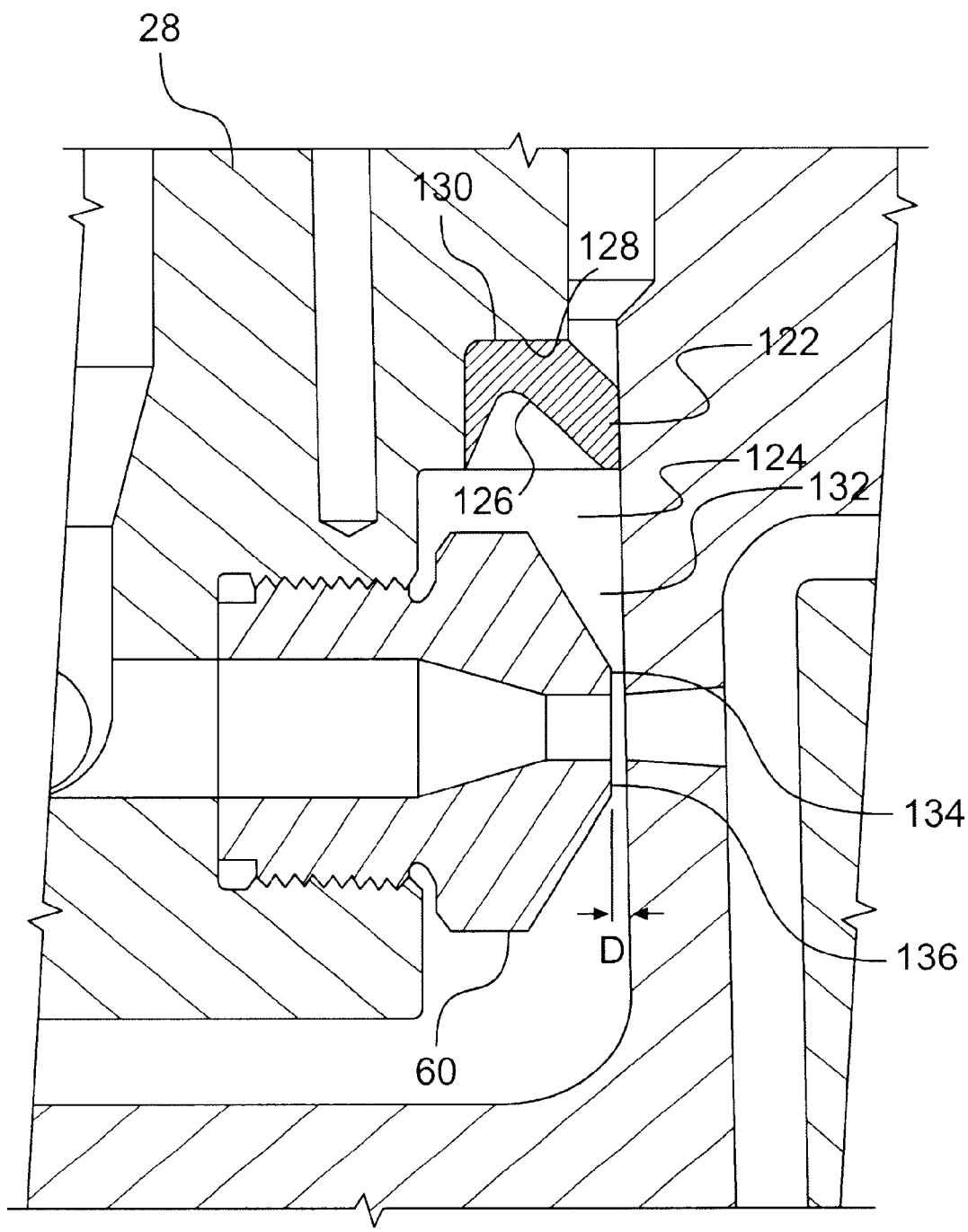

Referring to FIG. 7a, nozzle end 28 is adapted to receive a sealing ring 122 of the type described in U.S. Pat. No. 5,820,899 to Gellert et al., which is incorporated herein by reference. In this embodiment, circular sealing ring 122 extends around each nozzle to bridge the air space 124 between nozzle 12 and well 14 and to provide a seal against leakage of melt into well 14. Sealing ring 122 is preferably made of an insulative material such as titanium alloy. Referring to FIG. 7b, sealing ring 122 has a V-shaped front surface 126 and a rear end 128 which abuts against a circular shoulder 130 extending around nozzle end 28. Thus, the sealing ring 122 forms a sealed portion 132 of air space 124 around nozzle 12. The outer end 134 of nozzle tip 60 is spaced from the wall of the well 14 a predetermined distance "D" to form an opening 136 between them. Pressurized melt flows outwardly through this opening 92 during the initial injection cycle and partially solidifies in sealed portion 132 of air space 124. Distance "D" is made large enough to allow the melt to initially flow outwardly therethrough, but small enough to prevent the partially solidified melt in sealed portion 132 of air space 124 being sucked back into the melt stream flowing into the cavity 22 during subsequent injection cycles. In the embodiment shown, the distance "D" is preferably approximately 0.1 millimeters, although the distance can be varied depending upon the characteristics of the material being molded.

While the description of the present invention has been given with respect to a preferred embodiment, it will be evident that various modifications are possible without departing from the scope of the invention as understood by those skilled in the art and as defined in the following claims.

I claim:

1. An injection molding apparatus comprising:
   a plurality of mold cavities formed between at least one pair of mold plates, each cavity having a gate for communicating with an interior of said cavity;
   at least one injection molding nozzle body having a back end, a front end, at least one melt channel through said body and a heating member for heating said body, said nozzle body capable of receiving heated pressurized melt from a source and capable of feeding said heated pressurized melt from said back end through said melt channel to said front end; and
   a nozzle end threadably coupled to said front end of said nozzle body, said nozzle end having a bore therethrough extending from said melt channel at said body front end and communicating with at least two tips, each of said at least two tips having a tip melt channel extending from said nozzle end and communicating with at least one of said mold cavities, said at least two tips being threadably coupled to said nozzle end.

2. The apparatus of claim 1 wherein said nozzle end is made substantially of a material having a higher thermal conductivity than said nozzle body.

3. The apparatus of claim 1 wherein a rear portion of said nozzle end extends inside said nozzle body.

4. The apparatus of claim 3 wherein said rear portion of said nozzle end extends inside a heated portion of said nozzle body.

5. The apparatus of claim 3 wherein said rear portion of said nozzle end is made of a material having a higher thermal conductivity than said nozzle body.

6. The apparatus of claim 1 further comprising sealing means for inhibiting leakage of pressurized melt between said nozzle end and said mold.

7. In an injection molding apparatus having at least one heated nozzle extending forwardly into a well in a mold, said well having a wall with a plurality of gates spaced therein, each gate extending to a cavity in said mold, said nozzle having a rear end, a front end and a melt channel, said melt channel extending from an inlet at said rear end of said nozzle to an outlet at said front end of said nozzle, the improvement comprising:
   a nozzle end having a threaded rear portion that is coupled to said front end of said nozzle and a plurality of tips projecting from said nozzle end opposite said rear portion, said nozzle end having a bore extending therethrough, said bore extending between said melt channel outlet at said front end of said nozzle and said tips to communicate with said plurality of gates, said tips being removably attached to said nozzle via said threaded rear portion.

8. The apparatus of claim 7 wherein said nozzle end is made substantially of a material having a higher thermal conductivity than said nozzle.

9. The apparatus of claim 7 wherein a rear portion of said nozzle end extends inside said nozzle.

10. The apparatus of claim 9 wherein said rear portion of said nozzle end extends inside a heated portion of said nozzle.

11. The apparatus of claim 9 wherein said rear portion of said nozzle end has a higher thermally conductivity than said nozzle.

12. An injection molding apparatus comprising:
   at least one heated nozzle extending forwardly into a well in a mold, said well having a wall with a plurality of gates spaced therein, each gate extending to a cavity in said mold, said nozzle having a rear end, a front end and a melt channel, said melt channel extending from an inlet at said rear end of said nozzle to an outlet at said front end of said nozzle;
   a nozzle end having a threaded rear portion that is coupled to said front end of said nozzle and an opposite end, said nozzle end having a bore extending therethrough, said bore extending between said melt channel at said front end of said nozzle and a plurality of tips located adjacent said opposite end of said nozzle end to communicate with said plurality of gates, said tips being removably attached to said nozzle via said threaded rear portion.

13. An injection molding apparatus as claimed in claim 12, wherein said plurality of tips is removable from said nozzle end.

14. An injection molding apparatus as claimed in claim 13 wherein each of said plurality of tips is independently removable from said nozzle end.

15. An injection molding apparatus as claimed in claim 14, wherein each of said plurality of tips includes a melt channel.

* * * * *